United States Patent [19]

Beall et al.

[11] 4,395,271

[45] Jul. 26, 1983

[54] METHOD FOR MAKING POROUS MAGNETIC GLASS AND CRYSTAL-CONTAINING STRUCTURES

[75] Inventors: George H. Beall, Big Flats; Gerald R. Mansfield, Painted Post; Jan W. H. Schreurs, Corning, all of N.Y.

[73] Assignee: Corning Glass Works, Corning, N.Y.

[21] Appl. No.: 148,260

[22] Filed: May 9, 1980

Related U.S. Application Data

[62] Division of Ser. No. 29,577, Apr. 13, 1979, Pat. No. 4,233,169.

[51] Int. Cl.$^3$ .................... C03C 3/22; C03C 15/00
[52] U.S. Cl. ........................................ 65/31; 65/33
[58] Field of Search ................ 428/402, 900; 252/62.56, 62.58, 62.59, 62.6, 62.61, 62.62, 62.63, 62.64; 501/4, 39; 65/31, 33

[56] References Cited

U.S. PATENT DOCUMENTS

| | | | |
|---|---|---|---|
| 2,106,744 | 2/1938 | Hood et al. ..................... | 501/65 X |
| 2,472,490 | 6/1949 | Plank ............................... | 501/39 X |
| 3,650,721 | 3/1972 | Hammel et al. ................ | 65/3.15 X |
| 4,043,821 | 8/1977 | Le Bras .......................... | 501/8 |
| 4,124,735 | 11/1978 | O'Horo ........................... | 428/900 X |
| 4,126,437 | 11/1978 | O'Horo ........................... | 428/900 X |
| 4,140,645 | 2/1979 | Beall .............................. | 501/4 |

*Primary Examiner*—Richard V. Fisher
*Attorney, Agent, or Firm*—C. S. Janes, Jr.

[57] ABSTRACT

The present invention provides a method for making porous bodies of magnetic glass and/or crystal-containing materials having magnetic crystals incorporated therein with dimensions less than about 1000Å. Preferably, the crystals have dimensions less than 500Å such that the porous bodies demonstrate essential superparamagnetic behavior. The method involves preparing a body which, upon heat treatment, will separate into at least two vitreous phases and at least one crystal phase. One of the vitreous phases is etched away leaving a structure remaining which contains said magnetic crystals. When present as fine particles, the porous magnetic bodies are especially suitable for use in biological assays.

40 Claims, 1 Drawing Figure

METHOD FOR MAKING POROUS MAGNETIC GLASS AND CRYSTAL-CONTAINING STRUCTURES

This is a division of application Ser. No. 029,577, filed Apr. 13, 1979, now U.S. Pat. No. 4,233,169.

BACKGROUND OF THE INVENTION

Glasses and glass-ceramics of varying base ingredients, e.g., silicates, aluminosilicates, borosilicates, and phosphates, and containing iron oxide in substantial amounts are known to the art. When the batch materials are melted under oxidizing or neutral conditions, the glasses resulting therefrom can exhibit magnetic behavior, the magnitude of such behavior depending upon glass composition, annealing schedule, etc. When subsequently subjected to the proper heat treatment, however, minute crystals structurally similar to magnetite ($Fe_3O_4$) are developed and/or caused to grow in size within the glassy matrix and the magnetic behavior then displayed by the articles is significantly enhanced. The presence of appreciable magnetization in such articles is evidenced by the fact that small pieces thereof can be lifted with an ordinary laboratory permanent magnet. Also, when such articles are placed in the proximity of a magnetic compass, the needle thereof is deflected, thereby indicating that the earth's field is sufficient to induce perceptible magnetization in the glass. Two recently-issued patents disclosing such bodies are U.S. Pat. Nos. 4,043,821 and 4,126,437.

U.S. Pat. No. 4,043,821 is drawn to the production of glass-ceramic products having compositions, expressed in weight percent, of about 34–40% $SiO_2$, 2–6% $Al_2O_3$, 2–6% $B_2O_3$, 40–50% $SiO_2+Al_2O_3+B_2O_3$, 0–10% MgO, 24–40% CaO+MgO, 16–30% $Fe_2O_3$, and 0.7–2% $Cr_2O_3$ as the nucleating agent. The precursor glass bodies were crystallized in situ to glass-ceramic articles via heat treatment at temperatures between 850°–1000° C. The finished products were designed for excellence in resistance to bending and abrasion. Accordingly, the starting compositions and heat treatments were fashioned to favor the crystallization of wollastonite ($CaO \cdot SiO_2$) and hedenbergite ($CaO \cdot FeO \cdot 2SiO_2$), with rankinite ($3CaO \cdot 2SiO_2$) and magnetite ($Fe_3O_4$) being present as minor phases. The inclusion of alkali metal oxides is statedly to be avoided.

U.S. Pat. No. 4,126,437 is directed to glass compositions suitable as electrostatographic carrier materials exhibiting high magnetic permeabilities together with superparamagnetism. The single exemplary composition provided consisted, expressed in weight percent, of about 26.5% $SiO_2$, 22.6% $B_2O_3$, 15.3% CaO, 10.7% $Al_2O_3$, and 24.9% $Fe_2O_3$. The patent teaches melting the batch materials at temperatures up to 1350° C. and then quenching the melt to a glass. X-ray diffraction and electron microscopic analyses of the glass evidenced no trace of crystallinity therein. However, transmission electron microscopy, density, and magnetic measurements indicated the presence therein of microinhomogeneities in the form of amorphous phase separation. Such phase separation appeared to have dimensions on the order of about 100 Å and to consist of a continuous iron-depleted phase with islands of an iron-rich phase. Magnetic measurements determined that the iron-rich phase was composed of amorphous clusters of anti-ferro-magnetically coupled Fe ions. The bulk glass displayed paramagnetic behavior at ambient temperatures, due primarily to the nonclustered Fe ions in the glass.

The quenched glass was thereafter crushed to a particle size between about 100–200 mesh and the particles heat treated at about 600°–800° C. for times up to 24 hours to cause the growth of extremely minute $Fe_3O_4$ crystallites therein. In the preferred embodiment of the invention, the crystallites had sizes up to about 500 Å, thereby manifesting superparamagnetic behavior.

Glass and crystal-containing particles which exhibit magnetism would have tremendous potential utility as supports for biological materials employed in assays or reactors. (As used herein, the terms "magnetism" and "magnetic" will refer to materials which are either ferri-, ferro-, or superparamagnetic.) For example, in current practice an antibody, enzyme, or other protein is chemically bonded to a support which serves to immobilize the antibody, enzyme, or other protein. The supporting material is commonly in the form of powdered glass or an inorganic crystalline material which may be porous, if desired. The resulting composite body, i.e., the support plus the attached biological, is suspended in a liquid and reacted with reagents present therein. At some stage in the process, however, it becomes necessary to separate the composite body from the liquid. Centrifugation and/or filtering have customarily been utilized to accomplish this. Where magnetic particles are utilized, however, the application of an external magnetic field can be used, for example, to position the particles at a particular location within the reaction vessel while the liquid is decanted or aspirated away. This capability self-evidently allows the separation to be undertaken more conveniently than through centrifugation. Furthermore, magnetic separation techniques can discriminate against spurious non-magnetic particles, thus providing a more exacting and economical separation than is possible through centrifugation. High gradient separation techniques can be used permitting quite weakly magnetic particles to be separated from liquids and can be very useful in expediting separation.

The concept of employing magnetic materials as supports for assay purposes is not novel in itself, the use of $Fe_3O_4$ for this purpose being proposed in the literature. Nevertheless, that proposal has not been without problems. For example, finely-divided magnetite particles exhibit agglomeration even in the absence of a magnetic field. Agglomeration inhibits dispersion of the particles through the liquid volume, thereby slowing the reaction between the particles and the reagents in the liquid. A further factor militating against the widespread use of $Fe_3O_4$ as a support medium is its intrinsic lack of chemical durability when exposed to the various liquids commonly encountered in such assays. Finally, a porous support medium is normally desired since such provides greater surface area for the immobilization of biological materials thereon.

U.S. Pat. No. 4,140,645 discloses the preparation of glass and glass-ceramic articles which demonstrate efficient and uniform heating when placed in an oscillatory magnetic field and which articles contain magnetite crystals. The articles have overall compositions, expressed in weight percent on the oxide basis, selected from the groups of:

(a) 2–10% $Na_2O$ and/or $K_2O$, 5–20% $B_2O_3$, 15–40% FeO, 0–32% $Al_2O_3$, and 35–65% $SiO_2$; and (b) 1.5–6% $Li_2O$, 10–40% FeO, 10–20% $Al_2O_3$, 45–66% $SiO_2$, 0–5% $TiO_2$ and/or $ZrO_2$, and 0–5%

$B_2O_3$, at least 1% $B_2O_3$ being required when the proportion of FeO is less than 15%.

There is no discussion of forming porous bodies of such compositions.

OBJECTIVES OF THE INVENTION

Therefore, the primary objective of the instant invention is to provide highly porous, mechanically strong, chemically durable, magnetic, microporous bodies which may consist essentially solely of glass with magnetic particles enveloped therewithin, or which may comprise glass containing crystals along with the magnetic particles. The crystals may be relatively few in number or, if desired, may constitute the predominant phase of the body. When present in particulate form, such bodies, whether glass or highly crystalline, can demonstrate essential freedom from agglomeration.

Another objective of the instant invention is to provide a method for making such microporous bodies.

SUMMARY OF THE INVENTION

Those objectives can be achieved through the preparation of microporous bodies of glass and/or crystal-containing material having magnetic particles incorporated therein with dimensions of less than about 1000 Å which are essentially enveloped within the glass and/or crystal structure. The preparation of the microporous bodies is founded in glass compositions which, upon heat treatment, separate into at least two chemically-distinct, co-connected phases of different solubility. Such glasses, after heat treatment within a range of elevated temperatures, i.e., beginning in the vicinity of the transformation range of the glass but below the miscibility temperature of the two phases, are subjected to various etchants or leachants which preferentially remove the more soluble phase, leaving a skeletal structure composed of the less soluble phase. This removal of the more soluble phase provides microporous articles having interconnected pores.

The glass compositions demonstrating this phenomenon most commonly recognized in the prior art are found in the borosilicate system. Upon heat treatment, such glasses separate into a silica-rich phase and a borate-rich phase. The latter is relatively highly soluble in a number of aqueous media, including solutions of mineral acids, whereas the former phase is not.

One method illustrating the production of porous glass bodies utilizing glasses in the borosilicate field is described in U.S. Pat. No. 2,106,744. That disclosure observed that certain glass compositions in the alkali metal oxide-$B_2O_3$—$SiO_2$ system could be heat treated at temperatures of about 500°-750° C. to cause the glass to separate internally into two distinct vitreous phases, viz., one which is very rich in alkali metal oxide and $B_2O_3$ and the other being essentially silica. When contacted with an acid, customarily HCl or $H_2SO_4$, the phase containing alkali metal oxide and $B_2O_3$ is leached away, leaving a microporous structure of interconnected pores having a skeleton composed essentially of silica and retaining the overall dimensions and shape of the original body.

U.S. Pat. No. 3,650,721 also describes the production of microporous bodies prepared via the heat treating, with subsequent etching in mineral acids, of borosilicate-base glasses. That patent notes the utility of modifying oxides other than the alkali metal oxides in the precursor glass composition. Thus, the patent asserts the operability of the alkaline earth metal oxides, lead oxide, titanium oxide, zinc oxide, and zirconium oxide.

As has been pointed out above, the instant invention stems from the mechanism of phase separable glasses. However, during the phase separating phenomenon taking place between vitreous phases, crystals may also develop in the body. As a matter of fact, the instant invention relies upon the growth of iron-containing crystals to impart the desired magnetic character to the final product. Nevertheless, the generation of crystals other than iron-containing phases may also occur simultaneously with the separation of the vitreous phases. Such bodies may range from predominantly glasses, i.e., containing but a relatively few crystals other than iron-containing phases, to predominantly crystalline glass-ceramics. Such bodies are defined herein as "crystal-containing bodies" and encompass products having more than trace amounts of crystals in addition to iron-containing phases. It is possible that such crystals may incorporate therewithin a portion of an iron-containing phase. As utilized in the present context, the term "glass bodies" refers to those products consisting essentially solely of a vitreous structure having iron-containing crystals enveloped therewithin.

In the final product the pores will be relatively uniform in size and very small, viz., less than 10,000 Å in diameter and, preferably, less than 2000 Å. The bodies will exhibit excellent chemical durability in acid and mildly basic media, and the iron-containing, magnetic crystallites dispersed therewithin will be exceedingly small, less than 1000 Å in diameter, and, most preferably, less than 500 Å in diameter such that the bodies will display superparamagnetism.

Because of those physical and structural characteristics, the inventive glass and crystal-containing bodies, when present in finely-particulate form, will demonstrate relative freedom from agglomeration when the magnetic field is removed from their vicinity because of the low coercive force and remanant magnetization displayed thereby.

In the broadest terms, the preparation of porous magnetic glass and crystal-containing structures illustrating the desired physical and structural properties contemplates four general steps:

First, a batch is melted which, upon cooling and/or reheating, separates into at least three phases, viz., iron-containing magnetic crystals and two co-connected, chemically-distinct, vitreous phases of different solubility;

Second, the melt is simultaneously formed into a glass body and the body cooled to a temperature at least within the range of temperatures beginning in the vicinity of the transformation range of the glass but below the miscibility temperature of the two vitreous phases; (During this cooling, separation of the vitreous phases and development of iron-containing magnetic crystals and other crystals may be initiated.)

Third, the body is exposed to a temperature within the range of temperatures beginning in the vicinity of the transformation range of the glass but below the miscibility temperature of the two vitreous phases for a period of time sufficient to induce phase separation, where necessary, and, in any event, to coarsen the structure of the said vitreous phases, to modify the magnetic properties of said body, and, if the composition is proper, to develop and/or grow other crystals; and then Fourth, contacting said body with an etchant for a period of time sufficient to remove one of said vitreous phases and thereby produce a porous body containing interconnected pores.

Where desired, the body shaped from the molten batch may be cooled to room temperature to examine the glass quality thereof. Again, optionally, the melt may be rapidly quenched by running into a water bath as in dry gaging, for example, to form small glass particles. This latter practice can be useful where the application for the final porous product requires small particles such as, for example, where the bodies will be employed as supports for biological materials used in assays or reactors. Hence, the practice enables more rapid leaching, since the cross section of the particles is relatively small, and reduces the work involved in extensive crushing and comminuting to reduce a bulk body to a desired particle size.

The rapid quenching of the melt to cause fractionation thereof into small particles is believed to have a second, very practical advantageous effect. Thus, dry gaging appears to result in precipitating the iron-containing phase out of the melt in the form of large numbers of very small crystallites. It is conjectured that the extremely rapid increase in viscosity which occurs during quenching does not allow the growth of large crystals but, instead, the iron-containing component can only separate out as small crystallites. As will be explained in detail hereinafter, the desired superparamagnetic behavior of the inventive materials is a result of the extremely small size of the iron-containing crystallites.

Heat treatment over the range of temperatures beginning in the vicinity of the transformation range but below the miscibility temperature of the vitreous phases (this temperature has also been defined as the phase separation liquidus temperature) is required to induce phase separation between the vitreous phases where such was not initiated during the cooling of the melt (for example, where an extremely rapid quench of the melt is practiced), and, in any event, to coarsen (enlarge) the structure of the vitreous phases such that pores of a desired size will be formed during the subsequent leaching step. A temperature at least in the vicinity of the transformation range is necessary to permit movement within the vitreous phases and the growth of the crystal phases.

As was observed earlier, it is possible that crystals other than those of the desired iron-containing magnetic phase(s) may also develop as the melt is being cooled and/or during the heat treating step. For example, iron-containing, non-magnetic crystals such as hematite ($\alpha$-$Fe_2O_3$) may be generated. Where a borosilicate base composition is utilized, a highly siliceous crystal phase may develop. The proportion of the final product composed of such crystal phase and the identity of the crystals are a function of at least three factors: the original melt composition, the method of cooling the melt, and the overall heat treatment applied to the glass. Even where the composition is maintained constant, the identity, amount, and size of the crystals will be a function of the overall thermal history including melting, forming, and subsequent heat treatment.

Although other phase separable compositions can be operable in producing microporous bodies demonstrating the physical structural characteristics satisfying the objectives of the instant invention, the use of borosilicate base compositions therefor will be discussed hereinafter for purposes of illustration. Furthermore, because of ease in melting, heat treating, and leaching, the following description will be directed to glasses wherein the alkali metals, specifically $Na^+$ and/or $K^+$, constitute the predominant modifying ions. Again, the use of such composition must be deemed illustrative, not limitative.

Therefore, the preferred base compositions consist essentially, in weight percent on the oxide basis, of about 3-15% $Na_2O$ and/or $K_2O$, 10-25% $Fe_2O_3$, 10-40% $B_2O_3$, and 34-70% $SiO_2$. Various compatible oxides can be included in minor amounts, the total of all such additions not exceeding about 15% by weight. Examples of such optional ingredients include 0-10% $Al_2O_3$, 0-10% $CaO$, 0-5% $MnO$, 0-5% $CdO$, 0-3% $Li_2O$, 0-5% $PbO$, 0-5% $MgO$, 0-3% $P_2O_5$, 0-10% $ZnO$, 0-5% $NiO$, 0-5% $CoO$, 0-3% $Cr_2O_3$, 0-3% $V_2O_5$, 0-3% $MoO_3$, 0-5% $TiO_2$, and 0-5% $ZrO_2$. The latter five oxides appear to influence nucleation of the glass. Additions of $Al_2O_3$ and $ZrO_2$ appear to improve the chemical durability of the glass. Fluoride may be added as a melting aid but, being a powerful flux, will generally be maintained below about 2%. Upon melting the batch materials under oxidizing conditions (normally in an air atmosphere) and, optionally, annealing the resultant body, glass and crystal phases can frequently be detected within the body via X-ray diffraction analysis and the body typically exhibits some magnetism.

Where the body is predominantly glass, the body will be composed essentially of three phases. One phase consists of iron-containing, magnetic crystals (perhaps also containing some non-magnetic, iron-containing crystals) and the other two phases are co-connected, chemically-distinct, and vitreous, one of which is greatly enriched in alkali metal borate and the other substantially entirely silica. The inclusion of $Li_2O$ in the batch composition appears to enhance this vitreous phase separation, whereas the presence of $Al_2O_3$ seems to depress that phenomenon.

Where the development of crystals other than the desired iron-containing crystals is initiated, the resultant product will be composed of two crystal phases, as well as the two co-connected vitreous phases described above. Thus, one crystal phase will consist of iron-containing magnetic crystals with, perhaps, some non-magnetic, iron-containing crystals. The second crystal phase will customarily consist of a silica-containing species, most often exhibiting an X-ray diffraction pattern associated with cristobalite. Commonly, the siliceous crystal will be contiguous with, if not an integral part of, the continuous silica structure thereby, in essence, resulting in a two-phase (glass crystalline) silica structure.

The body prepared from the molten batch is then subjected to a heat treatment at temperatures between about 500°-700° C. for a sufficient period of time to enlarge or coarsen the structure of the co-connected phases, to modify the magnetic properties of the body, and, if crystals of a silica-containing species have been nucleated therein, to cause the growth of such crystals. It will be appreciated that the growth of crystals inherently results in a reduction in the overall amount of vitreous phase present since the components constituting the crystal phase will have been removed therefrom. Experience has indicated that at least a portion of the iron-containing phases will be enveloped within the silica phase even when that phase is predominantly crystalline. It will be recognized that, if desired, this heat treatment process may be entered into immediately upon forming the glass body. That is, the body need not be annealed to room temperature and then reheated. Rather, it need only be cooled to about 500°–650° C. to cause the development of two co-connected phases and a phase consisting of magnetic crystals with, optionally, other crystals. This practice can result in a more uniform heat treatment throughout the bulk of the body since the interior thereof will already be at an elevated temperature. In any event, the heat treated body is thereafter contacted with an etchant, customarily a mineral acid such as $HNO_3$, HCl, $H_2SO_4$, or $H_3PO_4$, to remove the non-silica vitreous phase plus any iron-containing crystals not enveloped within the silica phase. A porous body is produced having a crystalline and/or vitreous silica skeleton. HF or other compounds which readily attack silica will generally be avoided. The pores so generated can be, if desired, cleaned with a leachant, commonly an alkaline material such as an aqueous NaOH solution or, in certain instances, an organic acid, e.g., tartaric acid. Enlargement of the pores can be achieved by permitting more extensive attack of the silica structure by the leachant during the cleaning process. It may be desirable to perform a final acid wash to remove any iron-containing crystals which have been exposed during leaching. The final body consists essentially of a silica structure or skeleton with magnetic and, perhaps, non-magnetic crystallites incorporated therein.

The heat treatment step is governed by a time-temperature relationship. Thus, the time required for coarsening the co-connected structure, modifying the magnetic crystallites, and, optionally, growing crystals of a silica-containing species, is a function of the temperature employed. For example, whereas as brief a period as two hours may be sufficient at 650°–700° C., a week may be required at 500° C. Nevertheless, with thin-walled bodies particularly, long exposure periods at low temperatures reduce the chances of breakage and such exposures are to be preferred. Furthermore, longer treatments at lower temperatures appear to reduce the amount of non-$SiO_2$ materials in the siliceous phase, resulting in phases of very high purity silica. Stated differently, the extraneous materials appear to migrate to the borate phase where they are removed by the etchant. Glass composition has a perceptible effect upon the times and temperatures required. Also, the final pore size achieved is dependent upon the structural coarseness of the co-connected phases which, in turn, is governed by the time and temperature of the heat treatment. A minimum temperature of about 500° C. (in the vicinity of the transformation range) is required to cause movement, i.e., coarsening, of the co-connected phases. Excessively high temperatures, however, can lead to the solution of the two phases into each other (the miscibility temperature) and/or the development of crystal phases other than silica.

The time required for removal of or etching of the borate phase from the body is, of course, highly dependent upon the wall thickness thereof. Although the etching may be carried out at room temperature, slightly elevated temperatures appear to expedite the reaction. Consequently, the acids will customarily be heated to a temperature somewhat below the boiling point thereof. Also, the concentration of the acid affects the rate at which solution of the borate phase takes place.

In like manner, where cleaning or leaching out of the pores is undertaken, slightly heating the alkaline materials seems to increase the rate of reaction. And, again, the concentration of the alkaline material affects the rate at which dissolution occurs.

It is believed, however, that the proper parameters required for the etching and cleaning steps of a particular body are well within the technical ingenuity of the worker in the art.

Where porous particles of magnetic material are desired, the body produced from the molten batch will customarily be crushed or otherwise reduced to particles of a desired size at least prior to the etching process, since such reduction in size will reduce the time needed for the etching reaction.

If desired, the porous body can be heated to a sufficiently high temperature (customarily a temperature in the vicinity of the glass softening point or, if highly crystalline, to a temperature near the nominal softening point of the material) to cause incipient softening. This practice can improve the mechanical strength of the body by sealing microcracks therein while the pores remain generally unaltered in size. However, care must be exercised to avoid any substantial sticking together of the individual particles by excessive heating. The occurrence of such will require additional crushing to free the particles.

The magnetic particles evidence little tendency to agglomerate. Also, as has been noted above, the magnetic crystallites will be of very small size, less than about 1000 Å, and preferably less than 500 Å. Where the crystallites have dimensions less than 500 A, they exhibit behavior approaching superparamagnetism. Conventional demagnetization of magnetic particles suspended in a liquid which exhibit more than negligible remanence and coercive force is of only limited effectiveness because the magnetized particles rotate freely in the demagnetizing alternating field such that, in essence, the field is not truly demagnetizing. Consequently, the excellent spontaneous demagnetization characteristics of the preferred inventive magnetic materials allow magnetic separation to be used repeatedly in many stages of particle preparation and use.

The extremely small size of the magnetic crystallites has rendered positive identification thereof difficult. Nevertheless, in the simple base quaternary system, $Na_2O$ and/or $K_2O$—$Fe_2O_3$—$B_2O_3$—$SiO_2$, it is postulated that they are magnetite ($Fe_3O_4$) and/or solid solutions of $Fe_3O_4$ and $\gamma$-$Fe_2O_3$, since the overall structure appears to be similar to that of $Fe_3O_4$. However, it is believed that the inclusion of certain ions into the base composition, e.g., $Li^+$, $Mg^{+2}$, $Mn^{+2}$, and $Zn^{+2}$, can also lead to the growth of other magnetic crystallites, such as ferrite solid solutions, which exhibit similar structures. X-ray diffraction analyses have also indicated the occasional presence of hematite, i.e., non-magnetic $\alpha$-$Fe_2O_3$.

BRIEF DESCRIPTION OF THE DRAWING

The appended photograph comprises a scanning electron micrograph of the interior portion of an etched specimen of an inventive porous, essentially glass product depicting the vitreous silica skeleton-like structure and magnetic crystals enveloped therewithin.

DESCRIPTION OF THE PREFERRED EMBODIMENTS

Table I reports several exemplary compositions, expressed in weight percent of the oxide basis, of base glasses illustrating the parameters of the instant invention. The useful batch ingredients therefor may comprise any materials, either the oxide itself or other compound, which, when melted in conjunction with the other components, will be converted into the desired oxide in the proper proportions.

In preparing laboratory samples, batch ingredients to form about a kilogram of product were compounded, tumble mixed together to aid in achieving a homogeneous melt, and then placed into silica or platinum crucibles. The crucibles were moved to an electrically-fired laboratory furnace and the batches melted in contact with air (an oxidizing environment) for 16 hours at about 1400°-1650° C. In Examples 1-16, and 19-21, the melts were poured onto a steel sheet to yield slabs roughly seven inches square or a "fishtail"-shaped slab, and those slabs were immediately transferred to an annealer operating at about 500°-600° C. In all instances the annealed samples displayed some magnetism. The melts of Examples 17, 18, and 22 were dry gaged, i.e., the melts were poured as a stream into a container of water. This practice results in the so-quenched material being in the form of small particles. The quenched particles of Examples 17, 18, and 22 exhibited only weak magnetism.

X-ray diffraction analysis revealed the presence of substantial crystallization in the slab prepared from Example 21 after annealing. The dry gaged particles of Example 22 evidenced little crystallization therein, however.

It will be appreciated, of course, that in the commercial practice of the invention, large scale batches of similar proportions could be melted in pots or continuous melting tanks.

Process Embodiment I

A kilogram of batch materials suitable for the production of Example 19 above was tumble mixed together, deposited into an open platinum crucible, and melted in an atmosphere of air for 16 hours at 1500° C. The melt was poured onto a thick steel sheet to form a square-shaped patty about seven inches on a side and this patty was immediately transferred to an annealer operating at 600° C. A piece was sawed from the annealed patty and subjected to a temperature of 600° C. for 60 hours. The heat treated sample was crushed to relatively coarse particles for ease of study, i.e., passing a 40 mesh screen (420 microns), rather than the very fine particle sizes needed for biological assays. The particles were immersed for three hours into an aqueous 3 N $HNO_3$ solution operating at 100° C. The particles were washed several times in distilled water with sonication to remove the acid. Magnetic separation was utilized between washings, i.e., the particles were magnetically pulled to the side of the washing vessel and the liquid aspirated off. Thereafter, the particles were immersed for 75 minutes into an aqueous 1.25 N NaOH solution at room temperature. The particles were washed repeatedly in distilled water with sonication to bring the pH down to below 8. Again, magnetic separations were employed between washings. The particles were then dried at room temperature.

The variations of magnetic properties observed with temperature changes indicated the material to be essentially superparamagnetic. For example, it was noted that with decreasing temperatures the remanent magnetization increased with a corresponding increase in coercive force. Furthermore, a change toward paramagnetic behavior (linear dependence of the magnetization upon the magnetic field strength) was found with increasing temperatures. X-ray diffraction line broadening would suggest crystallites having dimensions of about 100-150 Å.

TABLE I

| | 1 | 2 | 3 | 4 | 5 | 6 | 7 | 8 | 9 | 10 | 11 |
|---|---|---|---|---|---|---|---|---|---|---|---|
| $SiO_2$ | 50 | 58 | 55 | 60 | 50 | 60 | 65 | 44.5 | 43.5 | 52 | 42.5 |
| $B_2O_3$ | 20 | 15.8 | 20 | 15 | 20 | 20 | 15 | 30 | 30 | 24 | 30 |
| $Na_2O$ | 5 | 5.2 | 5 | 5 | 5 | 5 | 5 | 7.5 | 7.5 | 6 | 7.5 |
| $Fe_2O_3$ | 25 | 21 | 20 | 20 | 20 | 15 | 15 | 15 | 15 | 15 | 15 |
| CaO | — | — | — | — | 5 | — | — | — | — | — | — |
| ZnO | — | — | — | — | — | — | — | 3 | 3 | — | — |
| $Al_2O_3$ | — | — | — | — | — | — | — | — | 1 | — | — |
| CdO | — | — | — | — | — | — | — | — | — | 3 | 3 |

| | 12 | 13 | 14 | 15 | 16 | 17 | 18 | 19 | 20 | 21 | 22 |
|---|---|---|---|---|---|---|---|---|---|---|---|
| $SiO_2$ | 43.5 | 39.5 | 39.5 | 53.25 | 52.35 | 52.6 | 53.5 | 50 | 57 | 47 | 47 |
| $B_2O_3$ | 30 | 34 | 35.5 | 24 | 24 | 24 | 24 | 15 | 20 | 28.6 | 28.6 |
| $Na_2O$ | 7.5 | 8.5 | 7.0 | 4.5 | 4.5 | 4 | 4 | 5 | 6 | 6.4 | 6.4 |
| $Fe_2O_3$ | 15 | 15.8 | 15 | 15 | 15 | 15 | 15 | 25 | 12 | 17.5 | 15.5 |
| ZnO | — | 2.2 | 3 | 3 | 3 | 3 | 3 | — | — | — | 2 |
| CdO | 3 | — | — | — | — | — | — | — | — | — | — |
| $Al_2O_3$ | 1 | — | — | — | — | — | — | — | 5 | — | — |
| $Li_2O$ | — | — | — | 0.25 | 0.25 | 0.5 | 0.5 | — | — | — | — |
| $MoO_3$ | — | — | — | — | 0.9 | 0.9 | — | — | — | — | — |
| CaO | — | — | — | — | — | — | — | 5 | — | — | — |
| $Cr_2O_3$ | — | — | — | — | — | — | — | — | — | 0.5 | 0.5 |

A piece was cut from the annealed slabs of Examples 1-16, 19, 20, and 21 and heat treated in accordance with the schedules set out in Table II. The heat treatment applied to the dry gaged glass particles of Examples 17, 18, and 22 is also recorded in Table II. Finally, Table II recites measurements of saturation magnetization ($M_s$), reported in terms of emu/g, and coercive force ($H_c$), stated in terms of oersteds. Average pore diameters, recorded in terms of Å, and average porosity, expressed in terms of ml/g, were determined employing conventional mercury intrusion porosimetry techniques.

Two exemplary heat treating and leaching processes are set forth in detail below.

Process Embodiment II

A kilogram of batch materials suitable for the production of Example 5 above was tumble mixed together, deposited into an open platinum crucible, and melted in an air atmosphere for 16 hours at 1500° C. The melt was poured as a free fishtail patty on a thick steel sheet and immediately transferred to an annealer operating at 525° C. A piece was sawed from the annealed patty and exposed to a temperature of 600° C. for 169 hours. Subsequently, the heat treated material was ballmilled to such an extent that the volume of particles having a size in excess of 2.4 microns was about 25% of the total volume. Such particle sizes are especially useful in biological assays. This powder was washed several times in distilled water utilizing magnetic separation to retain the desired particles and to eliminate chips and other grains abraded from the balls utilized in the ball mill. The balls were composed of non-magnetic materials. The particles were then immersed into a bath of 0.5 N $HNO_3$ operating at 95° C. and maintained therewithin for one hour. The $HNO_3$ was removed and the particles washed several times in distilled water with stirring. Magnetic separation was undertaken between washes. Thereafter, the particles were immersed into a bath of 0.5 N NaOH operating at 50° C. and held therewithin for 0.5 hour. The NaOH was removed and the particles repeatedly washed in distilled water with stirring, until the pH thereof surrounding the particles was less than 8. Again, magnetic separation was conducted between washes. The particles were then dried in a vacuum oven which was slowly raised in temperatures to somewhat over 100° C. Utilizing slightly elevated temperatures expedites the drying process. Chemical analysis of the porous material indicated a $B_2O_3$ content of 1.05% and a $Na_2O$ content of 0.27%.

of magnetite and hematite was also unmistakeably detected with, possibly, a very minor amount of tridymite, another polymorph of silica.

Tables III and IV further illustrate the changes in magnetic properties which result from variations in heat treatments of the precursor material and also dramatically point up the effect which the $Fe^{+2}$ ion content can have upon the phase separation phenomenon.

Table III lists the ingredients of three compositions, expressed in weight percent of the oxide basis as calculated from the batch. The ingredients were compounded, tumble mixed, and melted in an air atmosphere for 16 hours in like manner to Examples 1-22 of Table I. However, two batches of each were prepared, one being melted at 1500° C. and the other at 1650° C. Each melt was poured onto a steel sheet to form a fishtail-shaped slab and the slabs annealed similarly to those formed from the exemplary compositions of Table I. Pieces were sawed from the annealed slabs and subjected to temperatures of 600° and 650° C. for the times recorded in Table IV. The heat treated samples were thereafter crushed to relatively coarse particles, i.e., passing a 40 mesh screen, and then exposed to the $HNO_3$ and NaOH solutions in accordance with Process Embodiment I, supra. Table IV also recites analyzed values of $Fe^{+2}$, reported as FeO, and total iron in the annealed body, likewise recorded in terms of FeO, and reports measurements of $M_s$ (emu/g), $H_c$ (oersteds), average pore diameter (Å), and average porosity (ml/g) in the heat treated products.

TABLE II

| Example No. | Heat Treatment | Magnetic Properties of Bulk Material After Heat Treatment | | Pore Size | Porosity | Magnetic Properties of Porous Material | |
|---|---|---|---|---|---|---|---|
| | | $M_s$ | $H_c$ | | | $M_s$ | $H_c$ |
| 1 | 700° C. for 4 hours + 600° C. for 60 hours | — | — | 1200 | 0.75 | 9.3 | 304 |
| 2 | 600° C. for 60 hours | — | — | 500 | 0.26 | 22.6 | 236 |
| 3 | 550° C. for 69 hours | 12.3 | 130 | 260 | 0.22 | — | — |
| 4 | 550° C. for 69 hours | 15.3 | 104 | 175 | 0.34 | — | — |
| 5 | 550° C. for 69 hours | 11.1 | 16 | 220 | 0.14 | — | — |
| 6 | 550° C. for 69 hours | 11.0 | 157 | 450 | 0.53 | — | — |
| 7 | 550° C. for 69 hours | 10.3 | 74 | 250 | 0.5 | — | — |
| 8 | 575° C. for 15 hours | 7.4 | 32 | 270 | 0.3 | 10.1 | 16 |
| 9 | 575° C. for 15 hours | 7.8 | 73 | <100 | — | — | — |
| 10 | 575° C. for 15 hours | 11.9 | 236 | 220 | 0.14 | 12.5 | 110 |
| 11 | 575° C. for 15 hours | 9.4 | 90 | 280 | 0.33 | 9.6 | 76 |
| 12 | 575° C. for 15 hours | 7.6 | 82 | <100 | 0.08 | 10.6 | 69 |
| 13 | 565° C. for 38 hours | 7.0 | 3 | 200 | 0.3 | 10.0 | 5 |
| 14 | 565° C. for 38 hours | 4.9 | 7 | 500 | 0.5 | 6.6 | 9 |
| 15 | 550° C. for 23 hours | 11.4 | 105 | 220 | 0.18 | — | — |
| 16 | 550° C. for 23 hours | 14.6 | 134 | 350 | 0.08 | — | — |
| 17 | 600° C. for 20 hours | 7.3 | 50 | 400 | 0.18 | — | — |
| 18 | 600° C. for 20 hours | 5.0 | 11 | 300 | 0.18 | — | — |
| 5 | 600° C. for 169 hours | 11.6 | 13 | 300-1800 | 0.3 | 10.3 | 9 |
| 5 | 600° C. for 62 hours | — | — | 900 | 0.4 | — | — |
| 19 | 600° C. for 60 hours | — | — | 2100 | — | 5.5 | Very Small |
| 20 | 650° C. for 65 hours | — | — | 8000 | 0.35 | — | — |
| 21 | 580° C. for 69 hours | 6.3 | 106 | 500-1800 | 0.26 | 10.0 | 74 |
| 22 | 580° C. for 69 hours | 9.1 | 36 | 300-1800 | 0.28 | 10.6 | 27 |

X-ray diffraction analyses were conducted on the heat treated products of Examples 21 and 22, both before and after the leaching process. All of the specimens appeared to be highly crystalline, thereby attesting to the efficiency of $Cr_2O_3$ as a nucleating agent. As would be expected, the unleached samples contained more vitreous phase than the leached products. As a matter of fact, very little residual glassy matrix could be observed in the leached specimens. In each instance, the diffraction pattern associated with cristobalite, a polymorph of silica, was the most prominent. However, the presence

TABLE III

| | A | B | C |
|---|---|---|---|
| $SiO_2$ | 64 | 62 | 67 |
| $B_2O_3$ | 15 | 15 | 12 |
| $Na_2O$ | 5 | 5 | 4 |
| $Fe_2O_3$ | 15 | 15 | 15 |
| CaO | 1 | 3 | 2 |

TABLE IV

| Example No. | Melting Temp. | FeO | Total Iron | Heat Treatment | Magnetic Properties of Bulk Material After Heat Treatment $M_s$ | $H_c$ | Pore Size | Porosity | Magnetic Properties of Porous Material $M_s$ | $H_c$ |
|---|---|---|---|---|---|---|---|---|---|---|
| A | 1500° C. | 2.5 | 13.3 | 600° C. for 41 hours | 7.6 | 31 | 160 | 0.2 | — | — |
| A | 1500° C. | 2.5 | 13.3 | 650° C. for 24 hours | 9.6 | 120 | — | — | 7.2 | 370 |
| A | 1650° C. | 4.6 | 13.8 | 600° for 41 hours | 7.6 | 16 | Not porous | | | |
| A | 1650° C. | 4.6 | 13.8 | 650° C. for 24 hours | 10.3 | 256 | Not porous | | | |
| B | 1500° C. | 2.7 | 13.5 | 600° C. for 41 hours | 6.7 | 16 | 140 | 0.04 | — | 10 |
| B | 1500° C. | 2.7 | 13.5 | 650° C. for 24 hours | 8.6 | 300 | 680 | 0.11 | — | — |
| B | 1650° C. | 4.9 | 13.5 | 600° C. for 41 hours | 5.2 | 22 | Not porous | | | |
| B | 1650° C. | 4.9 | 13.5 | 650° C. for 24 hours | 8.3 | 284 | Not porous | | | |
| C | 1500° C. | 2.8 | 13.4 | 650° C. for 24 hours | 7.8 | 236 | 750 | 0.06 | 7.8 | 236 |
| C | 1650° C. | 4.9 | 13.6 | 600° C. for 41 hours | 4.6 | 65 | Not porous | | | |
| C | 1650° C. | 4.9 | 13.6 | 650° C. for 24 hours | 8.0 | 252 | Not porous | | | |

Table IV illustrates the caution that must be exercised in carrying out the heat treatment process. Thus, exposures to excessively high temperatures for extended periods of time lead to the growth of magnetic crystals of such size that any approach to superparamagnetic behavior is lost. This is demonstrated via a comparison of the coercive force values reported for the heat treatments at 600° C. and 650° C. In each instance, the measured coercive force of the 650° C. treatment exceeds 100 oersteds, the maximum that can be tolerated to provide a semblance of superparamagnetism. Hence, the exposure for 24 hours at 650° C. was of such length in time that excessive crystal growth ensued. This result is to be expected since crystal growth is generally a function of time and temperature, the rate of growth customarily increasing with higher temperatures.

Table IV also indicates the substantive effect which the oxidation state of the iron can have upon the extent of phase separation which will occur in the body. Thus, the porosity of the body is directly related to the presence of a readily-leachable phase. In the compositions of Table III (and Table I), this readily-leachable phase is greatly enriched in alkali metal borate. An inspection of Table IV quickly points up the fact that the specimens melted at 1650° C. did not undergo the same type of phase separation as that experienced by the samples melted at 1500° C., even though the subsequent heat treatment and leachings were similar, since the specimens melted at 1650° C. evidenced essentially no porosity.

It is of interest to observe that the content of reduced iron, as expressed in terms of FeO, is considerably higher in the samples melted at 1650° C. That this feature had no substantial effect upon the magnetic properties of the final products can be seen through a comparison of those values in Table IV. It would appear from the analyses of $Fe^{+2}$ that the melting environment for those batches melted at 1650° C. was more reducing (in the sense that some oxygen was expelled from the melt) than that to which the batches melted at 1500° C. were exposed, even though all the batches were melted in contact with air.

Whereas the reaction mechanism is not understood, it is believed that the $Fe^{+2}$ ions in some manner inhibit the phase separation desired. Consequently, to insure extensive phase separation, it has been adjudged that the $Fe^{+2}$ ion content, calculated as FeO, preferably ought not to exceed about 4% by weight of the total weight of the composition.

Nevertheless, it will be appreciated that if the $Fe^{+2}$ ions are present in the iron-containing crystals, e.g., in $Fe_3O_4$, rather than in the glass, they cannot interfere with the desired phase separation of the co-connected vitreous phases. That situation can be secured via modifications of the general inventive method. One such modification illustrating that practice is set out below:

Particles produced by dry gaging (quenching) the melt to at least below the transformation range thereof can be quickly heated to a temperature above the miscibility temperature of the vitreous phases, e.g., to between about 750°–850° C. for the above-described preferred compositions, and held at that temperature for a sufficient length of time to cause the development and/or growth of iron-containing crystals, thereby moving iron ions from the glass. The temperature employed will not be so high as to cause liquid flow of the glass but incipient sintering together of the glass particles may take place to form a glass body. The resultant body is thereafter immersed into water or rapidly quenched in some other manner to a temperature at least below the miscibility temperature of said two vitreous phases. Optionally, the body may be quenched all the way to room temperature. The body is then exposed to the regular heat treatment process, i.e., the body is heated to temperatures within the range beginning in the vicinity of the transformation range of the glass but below the miscibility temperature and held thereat for a sufficient length of time to cause separation of said two vitreous phases and/or to coarsen the structure of said vitreous phases and to modify the magnetic properties of the body. Finally, the body is contacted with an etchant to remove one of the vitreous phases.

Porous bodies of magnetic crystal-containing materials can be prepared utilizing a generally similar process. Thus, for example, dry gaged glass particles can be heated to a temperature above the miscibility temperature of the vitreous phases and maintained at that temperature to cause the development and/or growth not only of the iron-containing crystals but also possibly of crystals other than the iron-containing phase(s). Again, with the above-described preferred compositions, temperatures of about 750°–850° C. will be operable to generate the desired crystals. The resultant body can then be quenched and subjected to the temperatures necessary to effect phase separation. The growth of crystals other than the iron-containing phase(s) will also occur during this treatment.

This modification of the overall general method permits the use of high iron contents in the batch compositions with a consequent greater population of iron-containing crystals in the final product. The practice obviously relies upon the essential insolubility of the iron-containing crystals in the glass both at the higher crystal-growing temperature and at the temperature required for phase separation of the vitreous phases.

Variations upon the above method to achieve a like product are believed to be well within the ingenuity of the technician of ordinary skill in the art.

Figure 1:
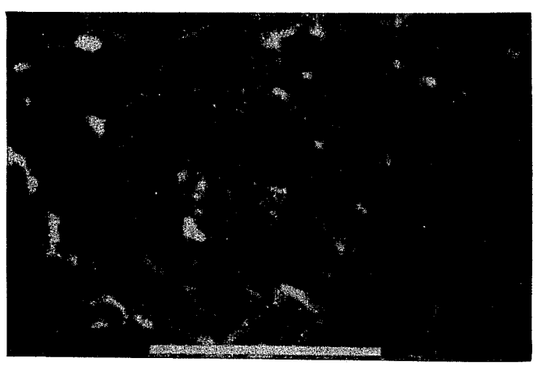

The photograph appended to the specification comprises a scanning electron micrograph prepared from the fractured edge of a chip broken from a slab of Example 5, the slab having previously been heat treated at 585° C. for 67 hours. The chip was immersed into 0.5 N $HNO_3$ at 95° C. for 1 hour. The chip was then washed with a 0.1% by weight aqueous solution of tartaric acid for 40 minutes at about 95° C., followed by washing in a 0.025% by weight aqueous solution of tartaric acid for 40 minutes at about 95° C. Finally, several washings were conducted in hot distilled water to remove the acid. The chip was dried and then broken across the original fractured surface. The photograph provides a view of a portion of that cross section and shows the typical skeleton of high silica content present in the porous body which is predominantly glass. The small nodules observed in the silica structure are believed to be magnetic crystals. It is postulated that the silica envelopment thereof inhibits the solution of the nodules in the etching solution. The presence of magnetic crystals within the silica skeleton can be inferred from the fact that, when the heat treated slab, from which the above-described chip was broken, was pulverized into fine particles and those particles were subjected to the same etching treatment, the particles demonstrated magnetic behavior. The white bar at the base of the micrograph represents a distance of one micron, thereby indicating an average pore size of about 1000 Å and crystal sizes of less than about 200 Å.

To insure essentially complete envelopment of the magnetic crystallites, their dimensions must be controlled to be less than the cross section of the silica skeleton, be it predominantly glass or predominantly crystalline. This factor has generally dictated a maximum crystallite diameter of about 1000 Å. As has been explained above, the ability of the particles to thoroughly demagnetize after being exposed to a magnetic field is quite desirable in minimizing agglomeration tendencies. Where the magnetic crystals are sufficiently small, i.e., less than about 500 Å, the thermal agitation inhere at room temperature is of such magnitude as to change the axis of magnetization. Consequently, the remanence and coercive force exhibited by particles containing such crystals are extremely small, i.e., they display superparamagnetic behavior. It has been observed that moderate quantities of impurities and composition changes can be introduced into superparamagnetic crystals without unduly increasing the coercive force thereof. In contrast, conventional soft magnetic materials have large, multi-domain crystals of closely-controlled composition. Small composition changes in such soft materials tend to sharply modify the coercive force thereof. Practical experience with solid magnetic glass and crystal-containing particles having diameters of about 1–2 microns has indicated that a coercive force of about 100 oersteds tends to initiate some agglomeration. Porous particles, intrinsicly having less magnetic crystal per unit volume, are less susceptible to agglomeration than are solid particles. Accordingly, porous magnetic materials with crystals of such small size that the coercive force thereof is less than 100 oersteds approach superparamagnetism closely enough for practical utility therefor. Nevertheless, whereas porous bodies of glass and crystal-containing materials having magnetic crystals incorporated therein with dimensions less than 500 Å and exhibiting coercive forces of less than 100 oersteds are operable, crystallites demonstrating even lower coercive forces, i.e., less than 40 oersteds, would be more desirable. Consequently, crystallites having sizes of less than 500 Å, desirably no more than about 200 Å, and exhibiting coercive forces of less than 40 oersteds are much preferred.

As has been explained above, any parent glass system which, upon cooling from a melt, separates into co-connected structures of at least two chemically-distinct phases of different solubilities that can be enlarged or coarsened when the body is heat treated, might be operable in the instant inventive process. Utilizing an alkali metal borosilicate glass as the precursor material is the preferred embodiment in that (1) the alkali metal borate phase can be readily etched away from the high silica phase, (2) most additives to the base glass composition appear to preferentially segregate into the borate phase, thereby resulting in a high degree of purity in the residual silica skeleton, and (3) the high silica skeleton displays excellent chemical durability in reagents used in biological assay work.

We claim:

1. A method for making porous bodies of magnetic glass with interconnected pores less than 10,000 Å in diameter and having iron-containing, magnetic crystals enveloped therewithin with dimensions less than about 1000 Å which method comprises the steps of:
   (a) melting a batch for a glass which, upon cooling and/or subsequent reheating, separates into at least three phases, viz., iron-containing magnetic crystals and two co-connected, chemically-distinct, vitreous phases of different solubility;
   (b) simultaneously forming the melt into a glass body and cooling to a temperature at least within the range beginning in the vicinity of the transformation range of the glass but below the miscibility temperature of said two vitreous phases, whereby separation of said two vitreous phases and development of said iron-containing magnetic crystals can be initiated;
   (c) exposing said glass body to a temperature within the range beginning in the vicinity of the transformation range of the glass but below the miscibility temperature of said two vitreous phases for a period of time sufficient to induce separation of said two vitreous phases and to develop said iron-containing crystals and/or to coarsen the structure of said vitreous phases and to modify the magnetic properties of said body; and then (d) contacting said glass body with an etchant for a period of time sufficient to remove one of said vitreous phases and thereby produce a porous glass body with interconnected pores, wherein said glass consists essentially of a vitreous silica skeleton.

2. A method according to claim 1 wherein said glass has a base composition in the borosilicate system.

3. A method according to claim 2 wherein said glass batch consists essentially, in weight percent on the oxide basis, of about 3-15% $Na_2O$ and/or $K_2O$, 10-25% $Fe_2O_3$, 10-40% $B_2O_3$, and 35-70% $SiO_2$.

4. A method according to claim 3 wherein said melt is simultaneously formed into a glass body and cooled to at least 500°-650° C. and thereafter said glass body is exposed to a temperature within the range of 500°-700° C.

5. A method according to claim 3 wherein said melting is conducted under such conditions that the $Fe^{+2}$ ion content, calculated as FeO, in said glass does not exceed about 4% by weight of the total weight of the glass.

6. A method according to claim 1 wherein said etchant consists of a mineral acid.

7. A method according to claim 6 wherein said mineral acid is selected from the group of $HNO_3$, $HCl$, $H_2SO_4$, and $H_3PO_4$.

8. A method according to claim 1 wherein subsequent to contacting said glass body with an etchant the porous body is contacted with a leachant.

9. A method according to claim 8 wherein said leachant is NaOH.

10. A method according to claim 1 wherein said magnetic crystals have dimensions of less than 500 Å and exhibit a coercive force of less than 100 oersteds such that said bodies demonstrate essential superparamagnetic behavior.

11. A method according to claim 10 wherein said magnetic crystals exhibit a coercive force of less than 40 oersteds.

12. A method according to claim 3 wherein said batch also contains up to 15% total of at least one oxide selected from the group of up to 10% $Al_2O_3$, up to 10% CaO, up to 5% MnO, up to 5% CdO, up to 3% $Li_2O$, up to 5% PbO, up to 5% MgO, up to 3% $P_2O_5$, up to 10% ZnO, up to 5% NiO, up to 3% $Cr_2O_3$, up to 5% CoO, up to 3% $V_2O_5$, up to 3% $MoO_3$, up to 5% $TiO_2$, and up to 5% $ZrO_2$.

13. A method according to claim 1 wherein said magnetic crystals are magnetite and/or solid solutions of magnetite with $\gamma$-$Fe_2O_3$.

14. A method according to claim 12 wherein said magnetic crystals are magnetite and/or solid solutions of magnetite with $\gamma$-$Fe_2O_3$ and/or other ferrite solid solutions having crytal structures similar to that of magnetite.

15. A method according to claim 1 wherein said glass body is reduced to particles of a desired size prior to being contacted by the etchant of Step (d).

16. A method according to claim 1 wherein said porous glass body is heated to a sufficiently high temperature to cause incipient softening and thereby seal microcracks in said body.

17. A method for making porous bodies of magnetic crystal-containing materials with interconnected pores less than 10,000 Å in diameter and having iron-containing, magnetic crystals enveloped therewithin with dimensions of less than about 1000 Å which method comprises the steps of:

(a) melting a batch for a glass which, upon cooling and/or subsequent reheating, separates into at least four phases, viz., iron-containing magnetic crystals other than said iron-containing crystals, and two co-connected, chemically-distinct, vitreous phases of different solubility;

(b) simultaneously forming the melt into a body and cooling to a temperature at least within the range beginning in the vicinity of the transformation range of the glass but below the miscibility temperature of said two vitreous phases, whereby separation of said two vitreous phases and development of said crystals can be initiated;

(c) exposing said body to a temperature within the range beginning in the vicinity of the transformation range of the glass but below the miscibility temperature of said two vitreous phases for a period of time sufficient to induce separation of said two vitreous phases and to develop said crystals and/or to coarsen the structure of said vitreous phases, to modify the magnetic properties of said body, and to cause the growth of said crystals other than iron-containing crystals; and then (d) contacting said body with an etchant for a period of time sufficient to remove one of said vitreous phases and thereby produce a porous body of crystal-containing material with interconnected pores, wherein said crystal-containing material consists essentially of a glassy-crystalline skeleton, said crystal portion thereof consisting essentially of a silica-containing species.

18. A method according to claim 17 wherein said glass has a base composition in the borosilicate system.

19. A method according to claim 18 wherein said glass batch consists essentially, in weight percent on the oxide basis, of about 3-15% $Na_2O$ and/or $K_2O$, 10-25% $Fe_2O_3$, 10-40% $B_2O_3$, and 35-70% $SiO_2$.

20. A method according to claim 19 wherein said melt is simultaneously formed into a body and cooled to at least 500°-650° C. and thereafter said body is exposed to a temperature within the range of 500°-700° C.

21. A method according to claim 19 wherein said melting is conducted under such conditions that the $Fe^{+2}$ ion content, calculated as FeO, does not exceed about 4% by weight of the total composition.

22. A method according to claim 17 wherein said etchant consists of a mineral acid.

23. A method according to claim 22 wherein said mineral acid is selected from the group of $HNO_3$, $HCl$, $H_2SO_4$, and $H_3PO_4$.

24. A method according to claim 17 wherein subsequent to contacting said body with an etchant the porous body is contacted with a leachant.

25. A method according to claim 24 wherein said leachant is NaOH.

26. A method according to claim 17 wherein said magnetic crystals have dimensions of less than 500 Å and exhibit a coercive force of less than 100 oersteds such that said bodies demonstrate essential superparamagnetic behavior.

27. A method according to claim 26 wherein said magnetic crystals exhibit a coercive force of less than 40 oersteds.

28. A method according to claim 19 wherein said batch also contains up to 15% total of at least one oxide selected from the group of up to 10% $Al_2O_3$, up to 10%

CaO, up to 5% CdO, up to 3% Li$_2$O, up to 5% MgO, up to 5% MnO, up to 5% PbO, up to 3% P$_2$O$_5$, up to 10% ZnO, up to 5% NiO, up to 3% Cr$_2$O$_3$, up to 5% CoO, up to 3% V$_2$O$_5$, up to 3% MoO$_3$, up to 5% TiO$_2$, and up to 5% ZrO$_2$.

29. A method according to claim 17 wherein said magnetic crystals are magnetite and/or solid solutions of magnetite with γ-Fe$_2$O$_3$.

30. A method according to claim 28 wherein said magnetic crystals are magnetite and/or solid solutions of magnetite with γ-Fe$_2$O$_3$ and/or other ferrite solid solutions having crystal structures similar to that of magnetite.

31. A method according to claim 17 wherein said body is reduced to particles of a desired size prior to being contacted by the etchant of Step (d).

32. A method according to claim 17 wherein said porous body is heated to a sufficiently high temperature to cause incipient softening and thereby seal microcracks in said body.

33. A method for making porous bodies of magnetic glass with interconnected pores less than 10,000 Å in diameter and having iron-containing, magnetic crystals enveloped therewithin with dimensions less than about 1000 Å which method comprises the steps of:
(a) melting a batch for a glass which, upon cooling and/or subsequent reheating, separates into at least three phases, viz., iron-containing magnetic crystals and two co-connected, chemically-distinct, vitreous phases of different solubility;
(b) quenching said melt to at least below the transformation range thereof and forming a glass body therefrom;
(c) rapidly heating said quenched glass body to a temperature above the miscibility temperature of said two vitreous phases and holding at that temperature for a sufficient length of time to cause the development and/or growth of said iron-containing magnetic crystals within said glass;
(d) quenching the resultant body to a temperature at least below the miscibility temperature of said two vitreous phases;
(e) exposing said body to a temperature within the range beginning in the vicinity of the transformation range of the glass but below the miscibility temperature of said two vitreous phases for a period of time sufficient to induce separation of said vitreous phases and/or to coarsen the structure of said vitreous phases and to modify the magnetic properties of said body; and then
(f) contacting said body with an etchant for a period of time sufficient to remove one of said vitreous phases and thereby produce a porous glass body with interconnected pores, wherein said glass consists essentially of a vitreous silica skeleton.

34. A method according to claim 33 wherein said glass batch consists essentially, in weight percent on the oxide basis, of about 3–15% Na$_2$O and/or K$_2$O, 10–25% Fe$_2$O$_3$, 10–40% B$_2$O$_3$, and 35–70% SiO$_2$.

35. A method according to claim 34 wherein said quenched glass body is rapidly heated to a temperature of about 750°–850° C.

36. A method according to claim 34 wherein said resultant body is quenched to at least 500°–650° C. and thereafter said body is exposed to a temperature within the range of 500°–700° C.

37. A method for making porous bodies of magnetic crystal-containing materials with interconnected pores less than 10,000 Å in diameter and having iron-containing, magnetic crystals enveloped therewithin with dimensions of less than about 1000 Å which method comprises the steps of:
(a) melting a batch for a glass which, upon cooling and/or subsequent reheating, separates into at least four phases, viz., iron-containing magnetic crystals, crystals other than said iron-containing crystals, and two co-connected, chemically-distinct vitreous phases of different solubility;
(b) quenching said melt below the transformation range thereof and forming a glass body therefrom;
(c) rapidly heating said quenched glass body to a temperature above the miscibility temperature of said two vitreous phases and holding at that temperature for a sufficient length of time to cause the development and/or growth of said iron-containing magnetic crystals;
(d) quenching the resultant body to a temperature at least below the miscibility temperature of said two vitreous phases;
(e) exposing said body to a temperature within the range beginning in the vicinity of the transformation range of the glass but below the miscibility temperature of said two vitreous phases for a period of time sufficient to induce separation of said vitreous phases and/or to coarsen the structure of said vitreous phases, to modify the magnetic properties of said body, and to cause growth of said crystals other than iron-containing crystals; and then
(f) contacting said body with an etchant for a period of time sufficient to remove one of said vitreous phases and thereby produce a porous body of crystal-containing material with interconnected pores, wherein said crystal-containing material consists essentially of a glassy-crystalline skeleton, said crystal portion thereof consisting essentially of a silica-containing species.

38. A method according to claim 37 wherein said glass batch consists essentially, in weight percent on the oxide basis, of about 3–15% Na$_2$O and/or K$_2$O, 10–25% Fe$_2$O$_3$, 10–40% B$_2$O$_3$, and 35–70% SiO$_2$.

39. A method according to claim 38 wherein said quenched glass body is rapidly heated to a temperature of about 750°–850° C.

40. A method according to claim 38 wherein said resultant body is quenched to at least 500°–650° C. and thereafter said body is exposed to a temperature within the range of 500°–700° C.

* * * * *